Patented Feb. 20, 1945

2,370,092

UNITED STATES PATENT OFFICE 2,370,092

ORGANIC AMINE DERIVATIVES AND METHOD OF OBTAINING SAME

Edward W. Tillitson, Grosse Pointe Farms, Mich., assignor to Parke, Davis & Company, Detroit, Mich., a corporation of Michigan No Drawing. Application May 4, 1942,
Serial No. 441,753

8 Claims. (Cl. 260—211)

The invention relates to a new class of products obtained by the interaction of organic amines, hydroxy aldehydes and bisulfite salts.

This application is a continuation-in-part of my copending application, Serial No. 223,763, filed August 8, 1938, now Patent No. 2,287,071, issued June 23, 1942, in which I have disclosed and claimed the preparation of new products obtained by reacting primary and secondary organic amines with a bisulfite salt and a hydroxy aldehyde.

The present application relates to the preparation of solubilized amino arsenicals having the formula,

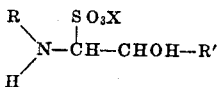

where R is an arsenic substituted aryl radical of the class consisting of the amino arsenobenzene radical,

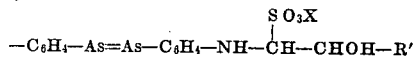

the phenyl arsenoxide radical, —$C_6H_5$—AsO and hydroxy and hydroxy-alkoxy substituted derivatives of said radicals, X is an alkali metal, and R' is a member of the group hydrogen, lower alkyl and hydroxy alkyl radicals.

Apparently, the hydroxy aldehyde bisulfite amine derivatives of the invention are comparatively easily decomposed in aqueous solution to give the original amine and can therefore be used instead of the amine and in many instances have an application where the free unreacted amine is unsuitable. The new compounds are especially valuable because of their increased solubility.

When the hydroxy aldehyde which reacts with the alkali bisulfite and the amine is an aldose, it may be a mono-saccharose or a di-saccharose and may contain two or more carbon atoms in the sugar part of the molecule.

The compounds of the aldo-sugar bisulfite type are particularly useful because the sugar and the bisulfite parts of the molecule are non-toxic and readily eliminated by the body and this enhances their therapeutic value.

In obtaining the compounds of the invention, the amine free base, the hydroxy aldehyde, and the bisulfite salt may be brought together for reaction in any order. Preferably, however, the bisulfite and the hydroxy aldehyde or sugar are first reacted and this reaction product is then further reacted or condensed with the amine free base.

Examples of compounds which come within the scope of the invention are the dextrose sodium sulfonate derivatives of 3-amino-4-($\beta$-hydroxy ethoxy) phenyl arsenoxide, 3-amino-4-($\beta$-hydroxy-n-propoxy) phenyl arsenoxide, 3-amino-4-hydroxy phenyl arsenoxide, 4-amino phenyl arsenoxide, 4,4'-diamino arsenobenzene, 3,3'-diamino-4,4'-dihydroxy arsenobenzene, 3,3'-diamino-4,4'-di($\beta$-hydroxy ethoxy) arsenobenzene, etc.

It is preferred, although it is not necessary, that the hydroxyl group of the hydroxy aldehyde used should be on a carbon atom adjacent to the aldehyde carbon atom. That is, an alpha hydroxy aldehyde reagent is preferred. Various hydroxy aldehydes, in addition to the usual aldo sugars, can be used to form the bisulfite derivatives. For example, one may use glyceraldehyde, $\alpha$-hydroxy propionaldehyde, $\alpha$-hydroxy butyraldehyde, glycollic aldehyde, various aldo-trioses, aldo-tetroses, aldo-pentoses, aldo-hexoses, aldo-heptoses, aldo-octoses, aldo-nonoses, etc.

The sulfur in the condensation products is probably present as in a sulfonic acid group,

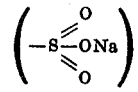

the sulfur having a valence of six instead of four. Hence, it seems proper to call the new compounds hydroxy aldehyde alkali metal sulfonate derivatives.

The condensation products of the invention have also been found to have a very greatly increased solubility over the free base and without loss of antiseptic activity. This property of increasing the solubility of the free base makes it possible to administer relatively high concentrations of internal antiseptic in very small volumes of solution, thus providing more convenient and better tolerated therapeutic preparations.

In reacting the amine free base with the hydroxy aldehyde and the bisulfite salt it may be desirable in some cases to use an excess of the aldehyde and bisulfite since I have found that the presence of an excess of the latter two substances frequently results in concentrated aqueous solutions of the condensate being more stable than when equimolecular proportions are reacted.

I do not wish to limit the invention by any theory as to the reactions which occur during formation of the new products. However, it appears that the condensation takes place somewhat as follows:

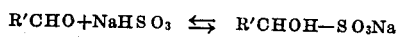
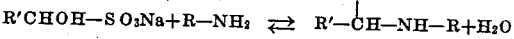

where R'CHO represents the hydroxy aldehyde and R—$NH_2$ represents the organic amine. On the basis of these reactions, there would be a possibility of decomposition of the final condensate in aqueous solutions and the presence of an excess of bisulfite salt or hydroxy aldehyde, or both, would in some cases tend to prevent the amine aldehyde bisulfite condensate from decomposing with precipitation of the less soluble amine free base.

The condensation can be carried out not only in aqueous solution but also, when the amine is sufficiently thermostable, by fusing the reactants together in the dry state. The fact that the condensates generally have far greater solubility than the amine free bases from which they are derived, shows that definite compounds are formed, probably in accordance with the equations given above.

When obtaining the products of the invention by fusion of the reagents in the dry state, it is preferred that the hydroxy aldehyde be brought to the liquid state, by heating if necessary, and the alkali bisulfite first added and then the amine free base. Vigorous stirring may be required and in the case of some aldehydes, such as sugars, careful temperature control may also be advisable in order to obtain a pure white product.

The following examples will serve to illustrate the invention:

*Example 1—3,3'-diamino-4,4'-dihydroxy arsenobenzene-N,N'-di-dextrose sodium sulfonate*

25 grams of 3-amino-4-hydroxy phenyl arsonic acid are reduced to the arseno compound by the usual means. The neutral wet paste of the arseno compound is reacted with 25 grams of dextrose and 12 grams of sodium bisulfite in hot aqueous solution under a carbon dioxide atmosphere to give a light yellow stable solution of the arsenical suitable for injection administration.

*Example 2—3,3'-diamino-4,4' - di - (β - hydroxy ethoxy) arsenobenzene-N,N'-di-dextrose sodium sulfonate*

25 grams of 3-amino-4-β-hydroxy ethoxy phenyl arsonic acid hydrate is reduced to the corresponding arseno compound with excess hypophosphorous acid. The neutralized wet pasty arseno compound is heated in an inert atmosphere at 80° with 22 grams of dextrose and 10.6 grams of sodium bisulfite, dissolved in 100 cc. of water and 10 cc. ethylene glycol until the solution is clear. The final volume is about 160 cc. The product is a light yellow stable solution suitable for injection purposes containing the arsenical in much higher concentration than can be obtained with the diamino free base alone.

*Example 3—3-amino-4-hydroxy phenyl arsenoxide dextrose sodium sulfonate*

Ten grams of 3-amino-4-hydroxy phenyl arsenoxide, 13 grams of dextrose and 6.8 grams of sodium bisulfite are heated with 75 cc. of water until solution is complete. The solution is filtered and then cooled in a carbon dioxide atmosphere. The ampouled solution is clear, stable and suitable for injection purposes.

The solution can be brought to dryness in a vacuum and the solid 3-amino-4-hydroxy phenyl arsenoxide dextrose sodium sulfonate obtained. It has the formula,

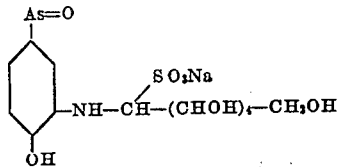

The above examples are given merely to illustrate the invention and are not intended to limit it to the specific substances or conditions therein disclosed.

What I claim as my invention is:

1. Organic amine derivatives having the formula,

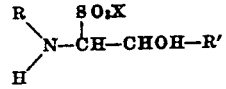

where R is an arsenic substituted aryl radical of the class consisting of the amino arsenobenzene radical,

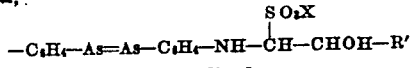

the phenyl arsenoxide radical,

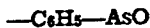

and hydroxy and hydroxy lower alkoxy phenyl nuclei-substituted derivatives of said radicals, X is an alkali metal, and R' is a member of the group hydrogen, lower alkyl and hydroxy lower alkyl radicals.

2. Organic amine derivatives of the formula

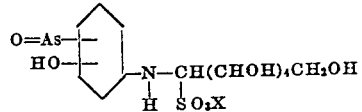

where X is an alkali metal.

3. 3-amino-4-hydroxy phenyl arsenoxide dextrose sodium sulfonate.

4. 3,3'-diamino-4,4'-dihydroxy arsenobenzene-N,N'-di-dextrose sodium sulfonate.

5. 3,3'-diamino-4,4' - di - (β - hydroxy ethoxy) arsenobenzene - N,N' - di - dextrose sodium sulfonate.

6. Method for obtaining a solubilized derivative of a relatively insoluble aminoaryl arsenical which comprises heating to a temperature not substantially above 155° C. to effect a condensation reaction between an aldo-sugar, an alkali metal bisulfite and an aminoaryl arsenical of the class consisting of compounds having the formulas $H_2N-C_6H_4-As=As-C_6H_4-NH_2$ and $H_2N-C_6H_4-AsO$ and compounds of said formulas wherein the phenyl nuclei also carry one member of the group consisting of hydroxy and hydroxy lower alkoxy radicals.

7. Method for obtaining a solubilized derivative of a relatively insoluble aminoaryl arsenical which comprises heating to a temperature not substantially above 155° C. to effect a condensation reaction between an aldo-sugar, an alkali metal bisulfite and an aminoaryl arsenical of the class consisting of compounds having the formula $H_2N-C_6H_4-AsO$ and compounds of said formula wherein the phenyl nucleus also carries one member of the group consisting of hydroxy and hydroxy lower alkoxy radicals.

8. Method for obtaining a solubilized derivative of a relatively insoluble aminoaryl arsenical which comprises heating to a temperature not substantially above 155° C. to effect a condensation reaction between an aldo-sugar, an alkali metal bisulfite and an aminoaryl arsenical of the formula,

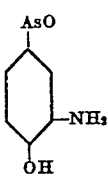

EDWARD W. TILLITSON.